(12) United States Patent
Ota

(10) Patent No.: US 10,795,035 B2
(45) Date of Patent: Oct. 6, 2020

(54) CHARGED PARTICLE TRACK DETECTOR

(71) Applicant: HAMAMATSU PHOTONICS K.K., Hamamatsu-shi, Shizuoka (JP)

(72) Inventor: Ryosuke Ota, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 16/344,502

(22) PCT Filed: Oct. 27, 2017

(86) PCT No.: PCT/JP2017/038966
§ 371 (c)(1),
(2) Date: Apr. 24, 2019

(87) PCT Pub. No.: WO2018/079730
PCT Pub. Date: May 3, 2018

(65) Prior Publication Data
US 2019/0243010 A1    Aug. 8, 2019

(30) Foreign Application Priority Data

Oct. 27, 2016   (JP) .................................. 2016-210998

(51) Int. Cl.
*G01T 1/20*    (2006.01)
*G01T 1/29*    (2006.01)
*G01T 5/00*    (2006.01)

(52) U.S. Cl.
CPC .  *G01T 1/29* (2013.01); *G01T 5/00* (2013.01)

(58) Field of Classification Search
CPC ......... G01T 1/22; G01T 1/2985; G01T 1/208; G01T 1/2928; G01T 1/363; G01T 1/29;
(Continued)

(56) References Cited

U.S. PATENT DOCUMENTS 6,552,347 B1 *   4/2003   Dimcovski ............... G01T 1/22
                                                    250/361 R
2011/0163236 A1 *  7/2011   Arodzero ............... G01N 23/04
                                                    250/361 R
(Continued)

FOREIGN PATENT DOCUMENTS

JP        S59-221946 A      12/1984
JP        2003-194941 A      7/2003

OTHER PUBLICATIONS

Charpak, G. et al., "The Use of Multiwire Proportional Counters to Select and Localize Charged Particles," Nuclear Instruments and Methods, 1968, vol. 62, pp. 262-268.
(Continued)

*Primary Examiner* — Irakli Kiknadze
(74) *Attorney, Agent, or Firm* — Faegre Drinker Biddle & Reath LLP

(57) ABSTRACT

A charged particle track detector includes a radiator including a medium that generates Cherenkov light by interacting with incident charged particles, a light detection unit in which a plurality of two-dimensionally arrayed pixels are disposed to correspond to a predetermined surface of the radiator, and a control unit configured to acquire position information and time information of the plurality of pixels that have detected the Cherenkov light based on a signal output from the light detection unit, and configured to obtain a track of the charged particles based on the acquired position information and the acquired time information, and a propagation locus of the Cherenkov light in the radiator.

7 Claims, 7 Drawing Sheets

(58) Field of Classification Search
CPC .......... G01T 1/20; G01T 1/2978; G01T 5/00;
G01T 1/2006; G01T 1/2018; G01T
1/2907; G01T 3/008; G01T 5/08; G01T
1/202; G01T 1/2002; G01T 1/2008; G01T
1/026; G01T 1/16; G01T 1/1603; G01T
1/161; G01T 1/1615; G01T 1/1642; G01T
1/1644; G01T 1/167; G01T 1/17; A61B
5/0071; A61B 6/037; A61N 2005/1059;
A61N 2005/1072; A61N 2005/1085;
A61N 5/1048; A61N 5/1071; A61N
5/1075; G06T 15/04; G06T 2200/04;
G06T 2207/30244; G06T 7/0012; G06T
7/85; G01N 23/04; G01V 5/0041; G01V
5/0008
USPC .......................... 378/62–68; 250/361 R, 369,
250/363.01–363.03, 366, 367
See application file for complete search history.

(56) References Cited

U.S. PATENT DOCUMENTS

2011/0220802 A1* 9/2011 Frisch .................. G01T 1/2928
250/363.03
2015/0338545 A1* 11/2015 Arodzero ................ G01V 5/00
378/57
2017/0123084 A1* 5/2017 Ferenc .................. G01T 1/2985
2017/0163971 A1* 6/2017 Wang .................... H04N 13/218

OTHER PUBLICATIONS

Etchegoyen, A. et al., "Muon-track studies in a water Cherekov detector," Nuclear Instruments & Methods in Physics Research, Section A, Apr. 15, 2005, vol. 545, pp. 602-612.

Iwata, S. et al., "Development of Ring Imaging Cherenkov counter for Belle II experiment a super KEKB," Physics Procedia, 2012, vol. 37, pp. 820-829.

Shiozawa, M., "Reconstruction algorithms in the Super-Kamiokande large water Cherenkov detector," Nuclear Instruments & Methods in Physics Research, Section A, Aug. 21, 1999, vol. 433, Issue 1-2, pp. 240-246.

Nemethy, P. et al., "TPC Tracking Inside a Cherenkov Detector," Nuclear Instruments and Methods in Physics Research, 1989, vol. A283, pp. 578-581.

International Preliminary Report on Patentability dated May 9, 2019 for PCT/JP2017/038966.

* cited by examiner

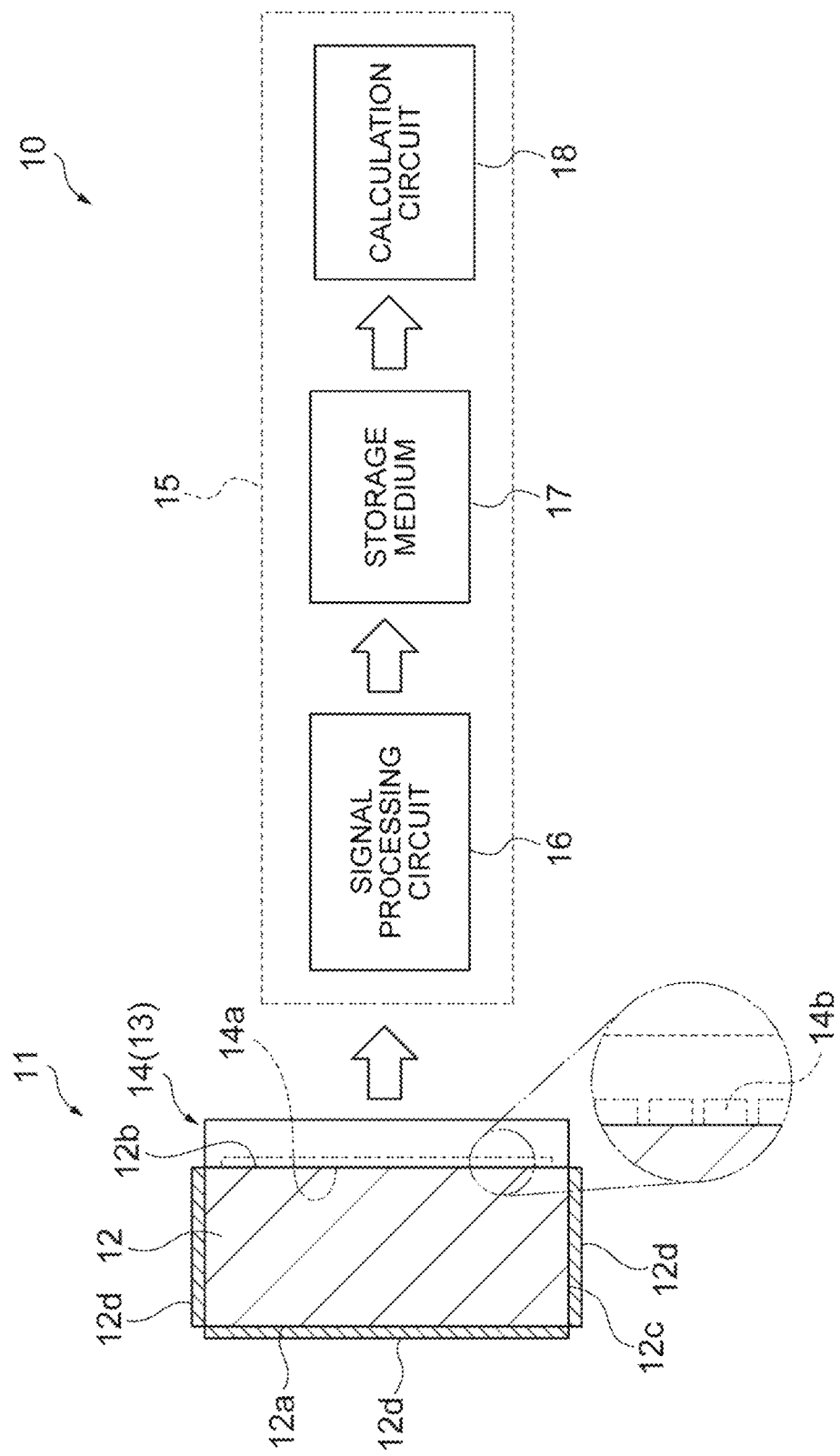

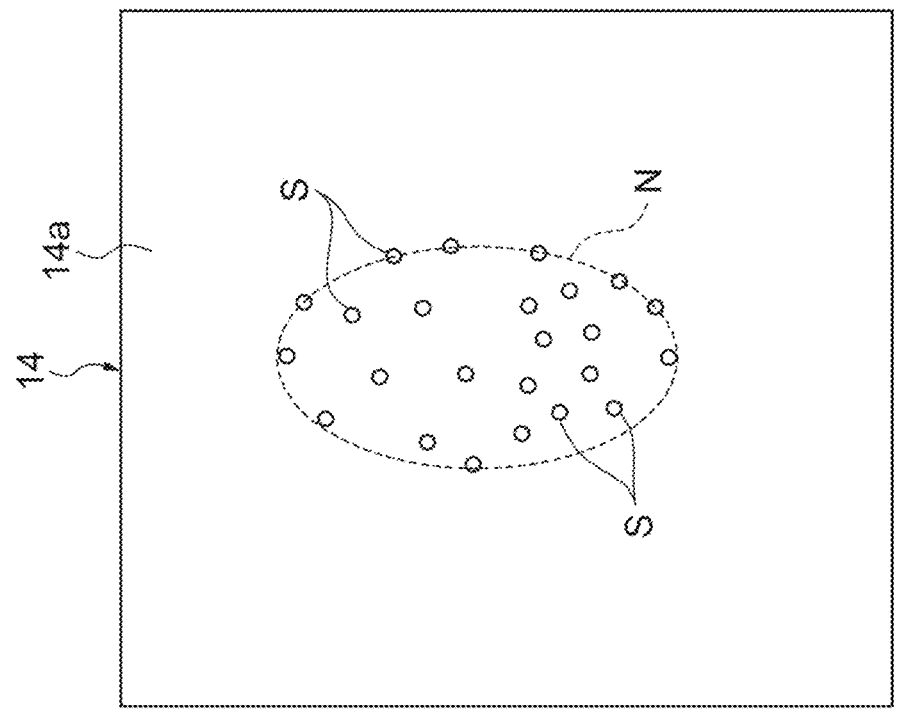
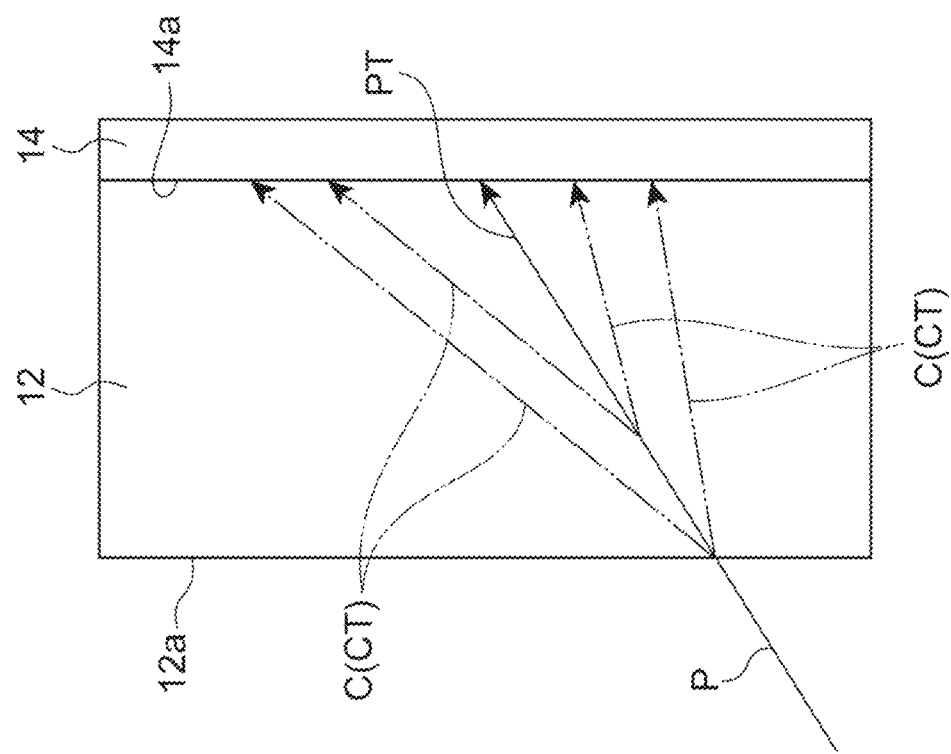

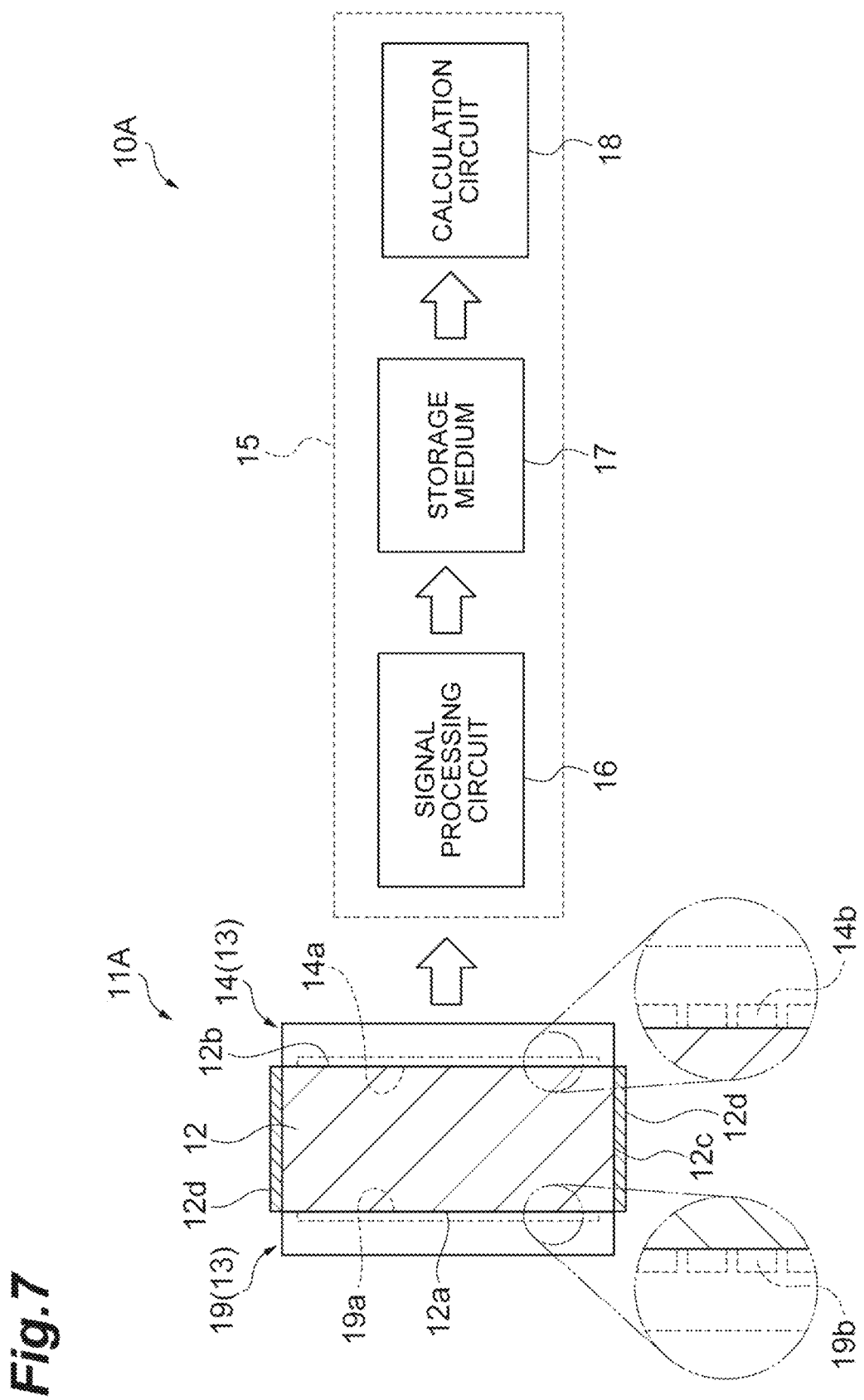

CHARGED PARTICLE TRACK DETECTOR

TECHNICAL FIELD

The present disclosure relates to a charged particle track detector.

BACKGROUND ART

Non-Patent Document 1 discloses a ring image type Cherenkov detector. This detector includes a radiator (a medium) disposed on a track of charged particles carried by an accelerator, and a photodetector disposed behind the radiator. In this detector, Cherenkov light generated when charged particles are incident on the radiator is detected by the photodetector, and a type of charged particles is specified based on a size of a detected ring.

Non-Patent Document 2 discloses a wire chamber in which a plurality of wires are disposed between two planar electrodes. In this device, a track of charged particles is specified based on an action in which the charged particles ionize molecules in a gas.

CITATION LIST

Patent Literature

[Non-Patent Document 1] S. Iwata et al., "Development of Ring Imaging Cherenkov counter for Belle II experiment at super KEKB" Phys. Proc., Vol. 37, (2012) p. 820-829

[Non-Patent Document 2] G. Charpak et al., "THE USE OF MULTIWIRE PROPORTIONAL COUNTERS TO SELECT AND LOCALIZE CHARGED PARTICLES", Nucl. Instrum. Meth. 62, (1968) p. 262-268

SUMMARY OF INVENTION

Technical Problem

Detection of a track of charged particles is expected to be applied to various technologies such as use as a trigger counter in a beam line of an accelerator, use as a track detector for charged particles in a beam line, or a tomographic imaging device that performs imaging using charged particles in cosmic rays.

An object of the present disclosure is to provide a charged particle track detector capable of accurately specifying a track of charged particles with high temporal resolution.

A charged particle track detector according to an aspect of the present disclosure includes a radiator including a medium that generates Cherenkov light by interacting with incident charged particles; a light detection unit in which a plurality of two-dimensionally arrayed pixels are disposed to correspond to a predetermined surface of the radiator; and a control unit configured to acquire position information and time information of the plurality of pixels that have detected the Cherenkov light based on a signal output from the light detection unit, and configured to obtain a track of the charged particles based on the acquired position information, the acquired time information, and a propagation locus of the Cherenkov light in the radiator.

In the charged particle track detector, when the charged particles are incident on the radiator, the charged particles interact with the medium and the Cherenkov light is emitted. The Cherenkov light propagates in one direction inside the radiator because of its high directivity. The Cherenkov light is detected by the plurality of pixels constituting the light detection unit. Therefore, it is possible to geometrically obtain the track of the charged particles from the position information and the time information of the plurality of pixels that have detected the Cherenkov light, and the propagation locus of the Cherenkov light. In the track of the charged particles, temporal resolution is high since the Cherenkov light is used. Therefore, it is possible to accurately specify the track of the charged particles with high temporal resolution.

Further, the control unit may further obtain a velocity of the charged particles. Accordingly, it is possible to specify the velocity of the charged particles, in addition to the track of the charged particles.

Further, the charged particle track detector may further include a light absorption layer that is provided on an outer surface of the radiator other than the predetermined surface and absorbs the Cherenkov light. Accordingly, it is possible to suppress reflection of the Cherenkov light on a medium surface and to reduce noise.

Further, the radiator may include a first surface and a second surface that face each other as the predetermined surfaces, and the light detection unit may include a first photodetector in which a plurality of two-dimensionally arrayed pixels are disposed to correspond to the first surface, and a second photodetector in which a plurality of two-dimensionally arrayed pixels are disposed to correspond to the second surface. Accordingly, it is possible to accurately specify the track of the charged particles with high temporal resolution for both of the charged particles incident on the radiator from the first surface side and the charged particles incident on the radiator from the second surface side.

Effects of Invention

According to the charged particle track detector according to an aspect of the present disclosure, it is possible to accurately specify a track of charged particles with high temporal resolution.

BRIEF DESCRIPTION OF DRAWINGS

FIG. 1 is a configuration diagram of a charged particle track detector according to a first embodiment.

FIG. 2A is a schematic diagram illustrating Cherenkov light emitted in a medium.

FIG. 2B is a schematic diagram illustrating Cherenkov light emitted in a medium.

FIG. 7 is a configuration diagram of a charged particle track detector according to a second embodiment.

DESCRIPTION OF EMBODIMENTS

Figure 3A:
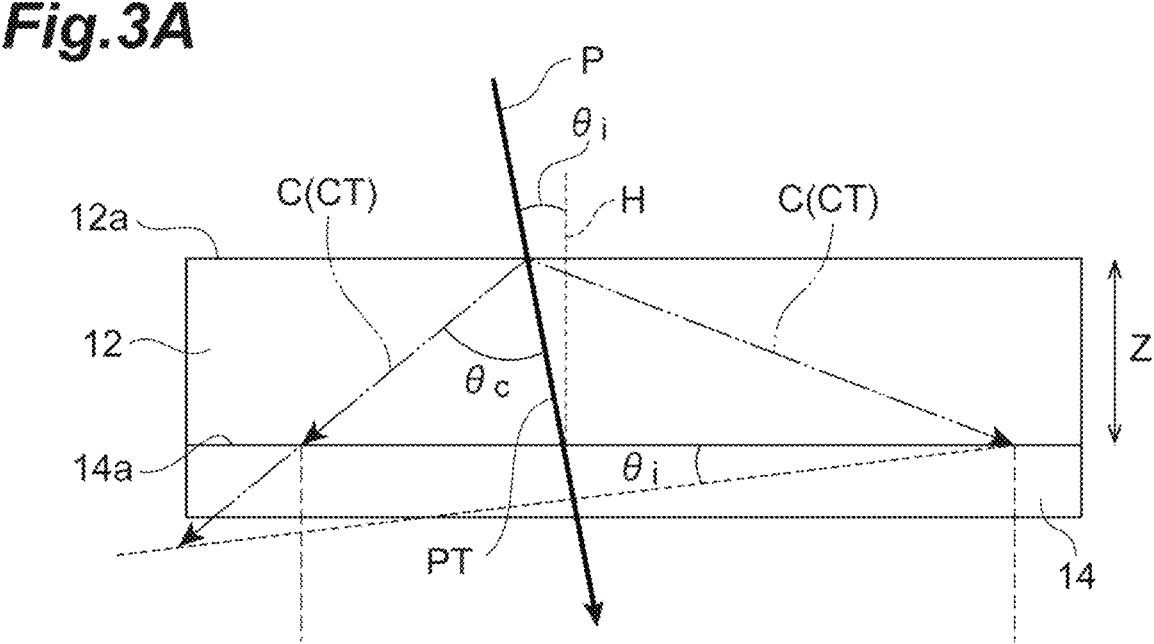
FIG. 3A is a diagram illustrating a principle of specifying a track of charged particles.

Hereinafter, embodiments of the present disclosure will be described in detail with reference to the drawings. For

First Embodiment

FIG. 1 is a block diagram illustrating a configuration of a charged particle track detector. As illustrated in FIG. 1, the charged particle track detector 10 includes a detection unit 11 having a radiator 12 and a light detection unit 13, and a control unit 15 including a signal processing circuit 16, a storage medium 17, and a calculation circuit 18. The charged particle track detector 10 specifies a track and a velocity of charged particles incident on a medium of the radiator 12.

The radiator 12 is made of a medium that generates Cherenkov light by interacting with incident charged particles. The radiator 12 has a flat plate shape including a front surface 12a and a back surface (a predetermined surface) 12b facing each other, and a side surface 12c connecting the front surface 12a to the back surface 12b. Inside the radiator 12, the Cherenkov light is generated according to the interaction of the incident charged particles. For example, when a density of the radiator 12 is low, it is easy for the charged particles to move in a straight line inside the radiator 12. In addition, generation of scintillation light inside the radiator 12 may cause noise. Therefore, the radiator 12 can be formed of a medium that has a low density and with which it is difficult to generate scintillation light, such as silica airgel ($SiO_2$) or acrylic.

A light absorption layer 12d that absorbs the Cherenkov light generated inside the radiator 12 is provided on the front surface 12a and the side surface 12c, which are outer surfaces other than the back surface 12b of the radiator 12. The light absorption layer 12d is, for example, a black tape adhered to the front surface 12a and the side surface 12c. The light absorption layer 12d may be a black coating film with which the front surface 12a and the side surface 12c have been coated. The light absorption layer 12d may absorb light other than the Cherenkov light.

The light detection unit 13 includes a first photodetector 14. The first photodetector 14 is provided on the back surface 12b of the radiator 12, and detects the Cherenkov light generated inside the radiator 12. The first photodetector 14 includes a detection surface 14a in which a plurality of pixels 14b that perform photoelectric conversion are arranged two-dimensionally. The plurality of pixels 14b are disposed to correspond to the back surface 12b of the radiator 12. More specifically, the first photodetector 14 is coupled to the radiator 12 so that the back surface 12b and the detection surface 14a face each other. Each of these pixels 14b can hold a segment address that is a part of position information of the pixel 14b on the detection surface 14a, and a detection time when the Cherenkov light has been detected at the segment address. The detection time is time information acquired based on a signal output from the first photodetector 14. The first photodetector 14 outputs the segment address, and the time information indicating the detection time to the control unit 15 as list data. Each pixel 14b may be constituted by, for example, a single photon avalanche diode (SPAD).

FIG. 2A and FIG. 2B are schematic diagrams illustrating the Cherenkov light emitted inside the radiator 12. In FIG. 2A, the radiator 12 and the first photodetector 14 are schematically illustrated in a cross-section view, and in FIG. 2B, the first photodetector 14 is schematically illustrated in a plan view. As illustrated in FIG. 2A, when the charged particles P are incident on the front surface 12a of the radiator 12, the charged particles P interact with each other inside the radiator 12, and the Cherenkov light C is emitted. The Cherenkov light C draws a propagation locus CT spreading in a conical shape around the track PT of the charged particles P. When the track PT of the charged particles P is inclined with respect to the detection surface 14a, a contour of positions S of the pixels 14b that detect the Cherenkov light C forms an ellipse N as illustrated in FIG. 2B. As an example, the charged particles P may have a sufficiently high energy such that the track PT in the radiator 12 becomes linear and a velocity of the charged particles P becomes substantially constant. As the charged particles P travel inside the radiator 12, the interaction of the charged particles P inside the radiator 12 is repeated. Therefore, the Cherenkov light C is emitted as the charged particles P travel inside the radiator 12.

As illustrated in FIG. 1, the control unit 15 is configured to acquire the position information and the time information of the plurality of pixels 14b that have detected the Cherenkov light C based on the signal output from the first photodetector 14. The control unit 15 is configured to obtain the track PT of the charged particles P based on the acquired position information and the acquired time information and the propagation locus CT of the Cherenkov light C in the radiator 12.

The signal processing circuit 16 acquires a plurality of pieces of list data from the first photodetector 14 and sorts the acquired pieces of list data based on the time information. Further, the signal processing circuit 16 determines whether or not the acquired list data is valid. When it is determined that the list data is valid, the signal processing circuit 16 stores the list data in the storage medium 17. The validity of the list data is determined based on whether or not the number of pieces of list data of the pixels 14b that have detected the Cherenkov light C emitted due to the same charged particles is equal to or greater than a predetermined number. For example, it is possible to determine the validity of the list data based on whether or not the number of pieces of list data falling within the time window having a predetermined time width is equal to or greater than a predetermined number. In this case, the time width of the time window is set so that only the pixels 14b that have detected the Cherenkov light C at the same time fall within the time window and is, for example, 500 ps.

The calculation circuit 18 acquires a plurality of pieces of list data determined to be valid by the signal processing circuit 16 from the storage medium 17. Based on the propagation locus of the Cherenkov light in the radiator 12, the track PT and velocity of the charged particles P are calculated from the plurality of pieces of list data. The calculation circuit 18 is, for example, a computer including a central processing unit (CPU) in which a computing process is performed, a storage device including a memory such as a read only memory (ROM) and a random access memory (RAM), and an input and output device. Further, the calculation circuit 18 may be constituted by a field-programmable gate array (FPGA) circuit. In the calculation circuit 18, a process for specifying the track PT and velocity of the charged particles P is executed based on a principle to be described below.

A principle of specifying the track PT of the charged particles P inside the radiator 12 will be described with reference to FIG. 3A, FIG. 3B, FIG. 4A, and FIG. 4B. FIG. 3A, FIG. 3B, FIG. 4A, and FIG. 4B are diagrams illustrating a principle of specifying the track of charged particles. In the example of FIG. 3A, the detection surface 14a is indicated by a solid line and the track PT of the charged particles P is indicated by a thick solid line. Further, the propagation locus CT of the Cherenkov light C is indicated by an alternating two-dots dashed line. An angle (an incidence angle) between a normal line H of the detection surface 14a and the track PT of the charged particles P is $\theta_i$, and the emission angle of the Cherenkov light C is $\theta_c$. In FIG. 3A, a surface along a major axis of the ellipse N formed by the contour of the positions of the pixels 14b of the first photodetector 14 that has detected the Cherenkov light C and along a normal line H is illustrated.

Figure 3B:
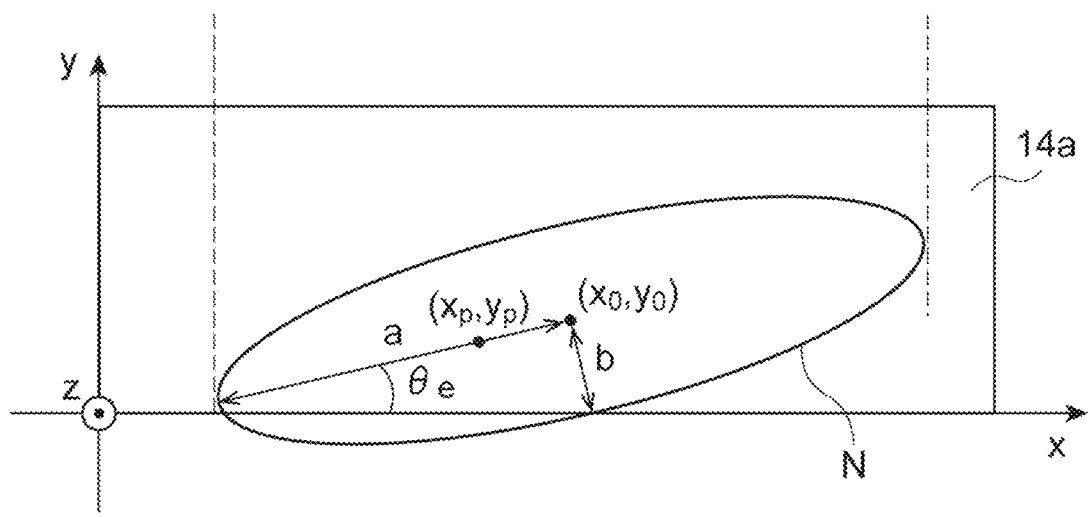
FIG. 3B is a diagram illustrating a principle of specifying a track of charged particles.

In the example of FIG. 3B, an origin may be set at an any position on the detection surface 14a of the first photodetector 14. An orthogonal coordinate system XYZ consists of an X-axis and a Y axis set on the detection surface 14a, and a Z axis extending to the radiator 12. In FIG. 3B, an X-Y plane is illustrated. In this case, the normal line H of the detection surface 14a of the first photodetector 14 is along a Z-axis direction.

As illustrated in FIG. 3B, the ellipse N fitted to the contour of the positions of the pixels 14b that have detected the Cherenkov light C has a shape obtained by cutting the propagation locus CT of the Cherenkov light C having a conical shape at the incidence angle $\theta_i$ and has a long diameter having a length of "a" and a short diameter having a length of "b". In the example of FIG. 3B, coordinates of a center point of the ellipse N are indicated by $(x_0, y_0)$, and an angle between the major axis of the ellipse N and the X-axis is an angle $\theta_e$.

Based on such a propagation locus CT of the Cherenkov light C and a segment address indicating the position of the pixels 14b that has detected the Cherenkov light C, it is possible to specify the emission angle $\theta_c$ of the Cherenkov light C and the incidence angle $\theta_i$ of the charged particles P. When a thickness of the radiator 12 is "Z", and a length "a" of the long diameter and a length "b" of the short diameter of the ellipse N are used, the emission angle $\theta_c$ is expressed as in Equation (1).

[Math. 1]

$$\theta_c = \arctan\left(\frac{b^2}{aZ}\right) \quad (1)$$

The incidence angle $\theta_i$ of the charged particles P is expressed as in Equation (2) using the thickness "Z" of the radiator 12, the length "a" of the long diameter, and the length "b" of the short diameter.

[Math. 2]

$$\theta_i = \arctan\left(\frac{Z}{b}\sqrt{\frac{a^2-b^2}{b^2+Z^2}}\right) \quad (2)$$

When a magnitude of the velocity of the charged particles P in the radiator 12 is $\beta$, a velocity vector of the charged particles P is obtained using the emission angle $\theta_c$ of the Cherenkov light C, the incidence angle $\theta_i$ of the charged particles P, and an angle $\theta_e$ formed by the major axis of the ellipse N and the X-axis. Here, since there is a velocity vector not only when the angle formed by the major axis of the ellipse N and the X-axis is the angle $\theta_e$, but also when the angle is an angle $\theta_e+\pi$, two candidates shown in Equation (3) and (4) below are determined for the velocity vector.

[Math. 3]

$$\vec{v}=\beta(\sin\theta_i\cos\theta_e,\sin\theta_i\sin\theta_e,\cos\theta_i) \quad (3)$$

[Math. 4]

$$\vec{v}=\beta(-\sin\theta_i\cos\theta_e,-\sin\theta_i\sin\theta_e,\cos\theta_i) \quad (4)$$

When the charged particles P having the velocity vector passes through the position indicated by the coordinates $(x_p, y_p)$ of the back surface 12b of the radiator 12, $x_p$ and $y_p$ can be obtained by using the coordinates $(x_0, y_0)$ of the center point of the ellipse N, the incidence angle $\theta_i$ of the charged particles P, the emission angle $\theta_c$ of the Cherenkov light C, the angle $\theta_e$ between the major axis of the ellipse N and the X-axis, and the length "a" of the long diameter. When the velocity vector is expressed by Equation (3), $x_p$ and $y_p$ are expressed as in Equation (5).

[Math. 5]

$$x_p=x_0-a\tan\theta_i\tan\theta_c\cos\theta_e$$

$$y_p=y_0-a\tan\theta_i\tan\theta_c\sin\theta_e \quad (5)$$

When the velocity vector is expressed by Equation (4), $x_p$ and $y_p$ are expressed as in Equation (6).

[Math. 6]

$$x_p=x_0+a\tan\theta_i\tan\theta_c\cos\theta_e$$

$$y_p=y_0+a\tan\theta_i\tan\theta_c\sin\theta_e \quad (6)$$

Using the above equation, the track PT of the charged particles P is specified as a locus of a straight line having a direction component of the velocity vector through the coordinates $(x_p, y_p)$.

Figure 4A:
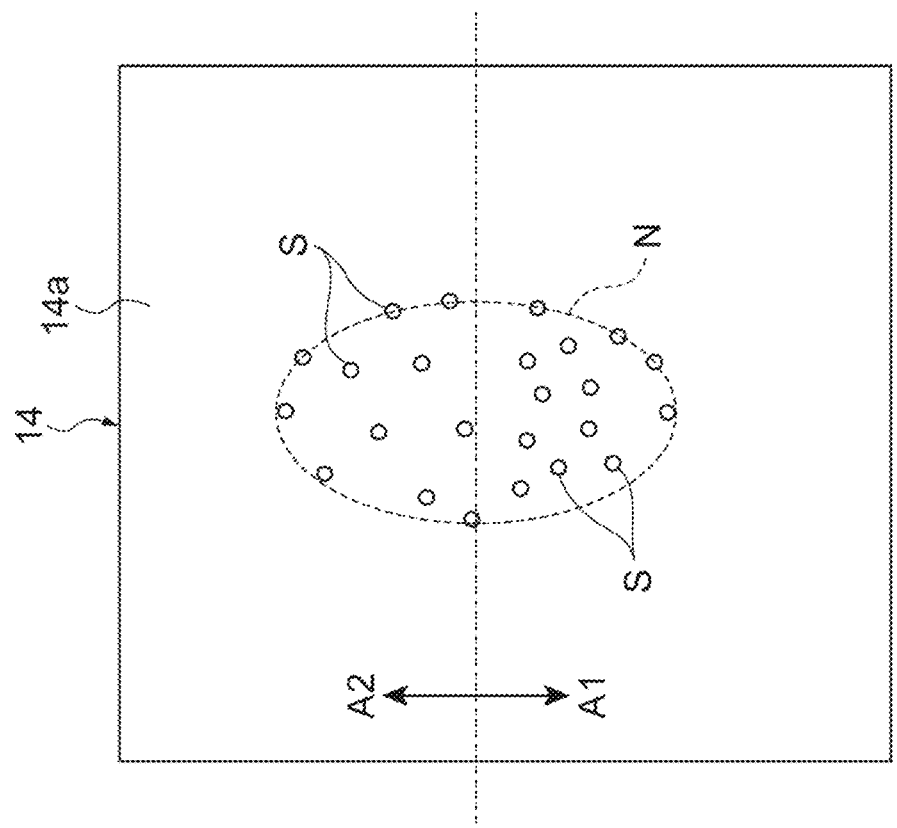
FIG. 4A is a diagram illustrating the principle of specifying a track of charged particles.
Figure 4B:
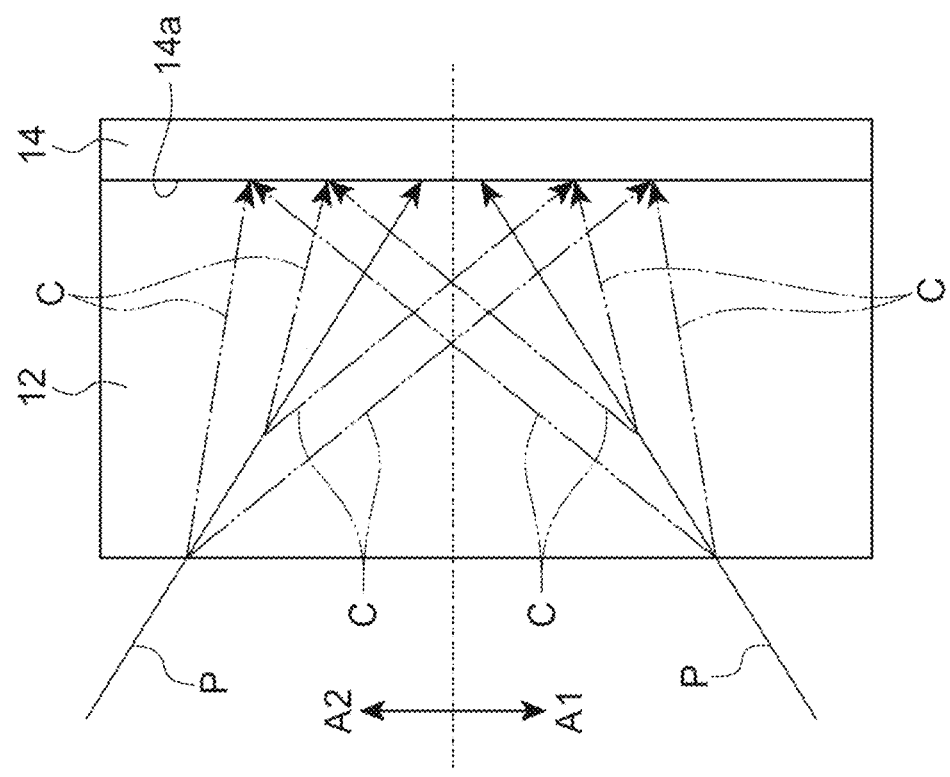
FIG. 4B is a diagram illustrating the principle of specifying a track of charged particles.

Here, since there are two candidates that are determined by Equation (3) or (4) for the velocity vector, there are two candidates for the track PT of the charged particles P, as illustrated in FIG. 4A. Specifically, there are two candidates for the track PT for a case in which the charged particles P are incident on the radiator 12 from one side in a major axis direction of the ellipse N and a case in which the charged particles P are incident on the radiator 12 from the other side in the major axis direction of the ellipse N. Therefore, it is difficult to determine which one of the two candidates is an actual track PT from only a shape of the ellipse N as illustrated in FIG. 4B. Therefore, which one of the two candidates for the track PT is an actual track PT is specified using the fact that the Cherenkov light C is emitted as the charged particles P travel inside the radiator 12, and the pixels 14b inside the ellipse N detect the Cherenkov light C.

As illustrated in FIG. 4B, the pixels 14b inside the ellipse N detect the Cherenkov light C emitted from the charged particles P traveling inside the radiator 12. Accordingly, inside the ellipse N, a certain distribution according to the incidence angle $\theta_i$ of the charged particles P occurs with respect to a density of photons of the Cherenkov light C on the detection surface 14a (hereinafter, also simply referred to as a "photon density"). The photon density is calculated, for example, based on the number of pixels 14b that have detected the Cherenkov light C and the segment address in the same time window. The photon density is a part of the position information of the plurality of pixels 14b that have detected the Cherenkov light C.

For example, the detection unit 11 may be virtually divided into two areas A1 and A2 on a surface orthogonal to the major axis direction of the ellipse N, which is a surface including the minor axis of the ellipse N, as illustrated in FIG. 4B. In the example of FIG. 4B, the photon density in the area A1 is higher than the photon density in the area A2. Here, photons propagating inside the radiator 12 can be scattered or absorbed with a constant probability. Therefore, when an optical path from the track PT to the detection surface 14a is shorter, a probability of detection of the pixel 14b becomes higher, such that the photon density becomes higher. Conversely, when the optical path from the track PT to the detection surface 14a is longer, the probability of detection of the pixel 14b becomes lower, such that the photon density becomes lower. Therefore, it is possible to specify, as the actual track PT, the track PT in an area in which the photon density is higher between the areas A1 and A2 (herein, the area A1), between the two candidates.

Figure 5B:
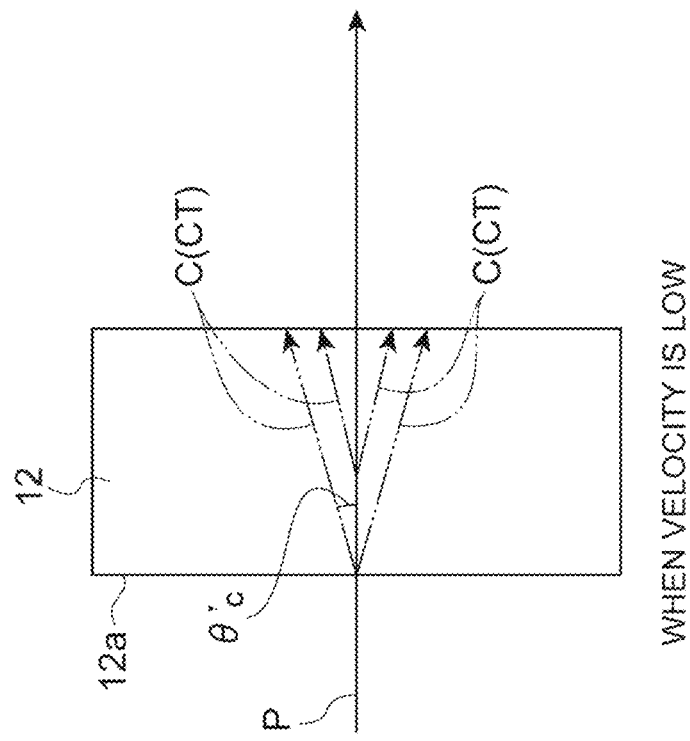
FIG. 5B is a diagram illustrating a principle of specifying a velocity of charged particles.
Figure 5A:
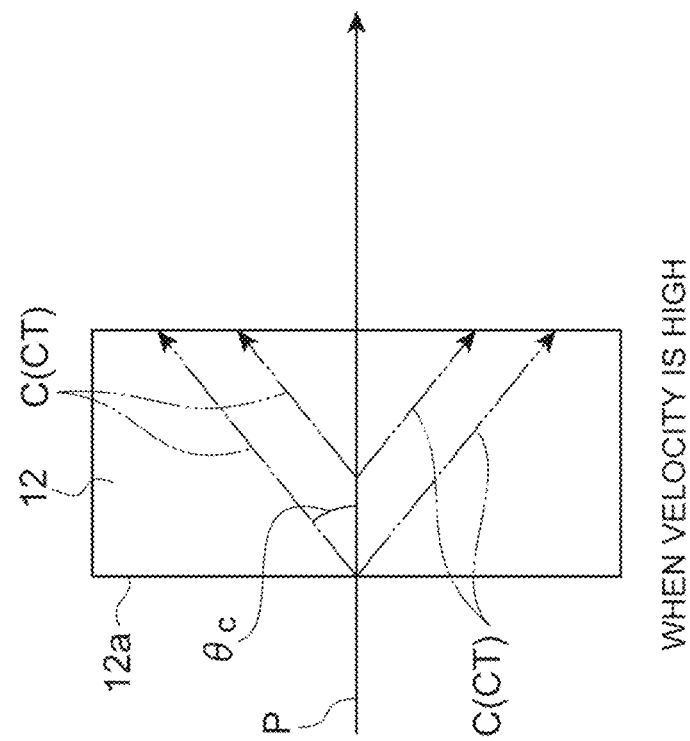
FIG. 5A is a diagram illustrating a principle of specifying a velocity of charged particles.

Subsequently, the principle of specifying the velocity of the charged particles P inside the radiator 12 will be described with reference to FIG. 5A and FIG. 5B. FIG. 5A and FIG. 5B are diagrams illustrating the principle of specifying the velocity of charged particles. FIG. 5A and FIG. 5B illustrate a case in which the charged particles P are perpendicularly incident on the front surface 12a of the radiator 12 for simplicity of description. In FIG. 5A and FIG. 5B, the track PT of the charged particles P is indicated by a broken line, and the propagation locus of the Cherenkov light C is indicated by an alternating two-dots dashed line.

As described above, the Cherenkov light C draws the propagation locus CT spreading in a conical shape around the track PT. When a refractive index of the medium of the radiator 12 is "n" and the velocity of the charged particles P inside the radiator 12 is "β", the emission angle $\theta_c$ of such Cherenkov light C satisfies a relationship of Equation (7).

[Math. 7]

$$\beta = \frac{1}{n \cos \theta_c} \quad (7)$$

In examples of FIG. 5A and FIG. 5B, an emission angle $\theta_c$ in FIG. 5A is larger than an emission angle $\theta'_c$ in FIG. 5B. In this case, the velocity of the charged particles P in FIG. 5A is higher than the velocity of the charged particles P in FIG. 5B.

Figure 6:
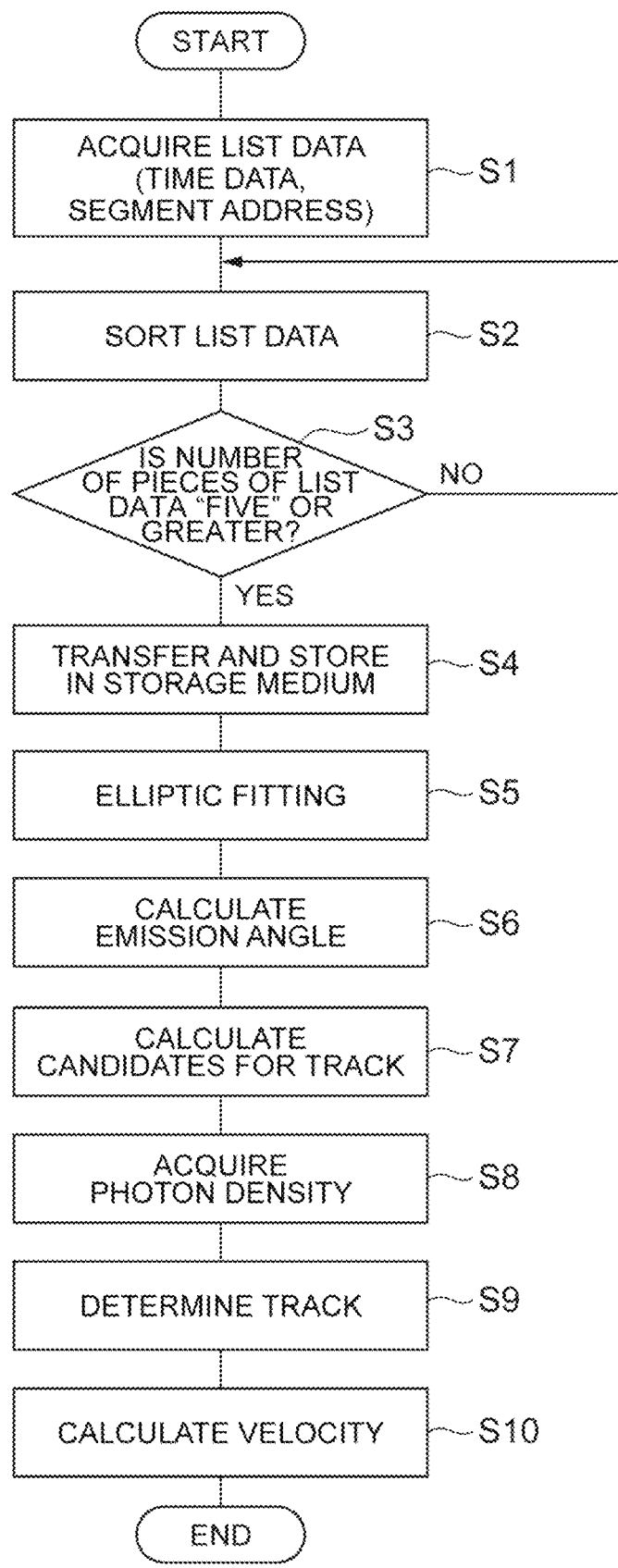
FIG. 6 is a flowchart illustrating a process of a control unit.

Next, a process flow of the control unit 15 will be described. FIG. 6 is a flowchart illustrating a process of the control unit 15. First, the signal processing circuit 16 acquires list data output from each pixel 14b of the first photodetector 14 (step S1). The list data includes time information indicating a time when the pixel 14b detects the Cherenkov light, and a segment address indicating the position of the pixel 14b.

The signal processing circuit 16 sorts the plurality of acquired pieces of list data based on time information (step S2). The signal processing circuit 16 acquires the list data group that falls within the time window from the sorted list data, and determines the number of pieces of list data constituting the acquired list data group (step S3). In this case, a difference between the pieces of time information of the respective pieces of list data constituting the list data group falls within the time width of the time window. In step S3, when the number of pieces of list data constituting the list data group is equal to or greater than a predetermined number, these pieces of list data are transferred to and stored in the storage medium 17 (step S4). The predetermined number is a threshold value of the number of pieces of list data for determining whether or not the signal processing circuit 16 transfers the list data to the storage medium 17 and stores the list data in the storage medium 17. When the number of pieces of list data constituting the list data group is smaller than the predetermined number, these pieces of list data are processed as invalid data. In this case, the generation position of the Cherenkov light is not obtained. As an example, it is determined in step S3 that the data is valid when the number of pieces of list data is equal to or greater than five, but the predetermined number can be arbitrarily determined in practice.

Subsequently, elliptic fitting based on the list data group stored in the storage medium 17 is performed by the calculation circuit 18 (step S5). That is, the calculation circuit 18 derives an ellipse that fits to the contour of the positions indicated by the segment addresses of the respective pieces of list data constituting the list data group. In the embodiment, since the number of pieces of list data constituting the list data group is equal to or greater than five, one ellipse can be specified. The elliptical fitting can be obtained, for example, by approximation using robust estimation. The calculation circuit 18 acquires coordinates of a center ($x_0$, $y_0$) of the ellipse, the length "a" of the long diameter, the length "b" of the short diameter, and the angle $\theta_e$ formed by the major axis of the ellipse N and the X-axis from the derived information of the ellipse.

The calculation circuit 18 calculates the emission angle $\theta_c$ based on the determination principle using the acquired information on the ellipse (step S6), and calculates candidates for the track PT using the emission angle $\theta_c$ (step S7). The calculation circuit 18 acquires the photon density based on the list data group stored in the storage medium 17 (step S8) and uniquely determines the track PT based on the acquired photon density (step S9). Thereafter, the calculation circuit 18 calculates the velocity of the charged particles P using the calculated emission angle $\theta_c$ (step S10).

In the charged particle track detector 10 described above, when the charged particles P are incident on the radiator 12, the charged particles P interact with the medium and the Cherenkov light C is emitted. The Cherenkov light C propagates in one direction inside the radiator 12 because of its high directivity. The Cherenkov light C is detected by the plurality of pixels 14b constituting the first photodetector 14 of the light detection unit 13. Therefore, it is possible to geometrically obtain the track PT of the charged particles P from the position information and the time information of the plurality of pixels 14b that have detected the Cherenkov light C, and the propagation locus CT of the Cherenkov light C. In the track PT of the charged particles P, temporal resolution is high since the Cherenkov light C is used. Therefore, it is possible to accurately specify the track PT of the charged particles P with high temporal resolution.

In the charged particle track detector 10, the control unit 15 further obtains a velocity β of the charged particles P. Accordingly, it is possible to specify the velocity β of the charged particles P, in addition to the track PT of the charged particles P.

The charged particle track detector 10 further includes the light absorption layer 12d that is provided on the front surface 12a and the side surface 12c that are outer surfaces of the radiator 12 other than the back surface 12b and absorbs the Cherenkov light C. Accordingly, it is possible to suppress reflection of Cherenkov light C on a medium surface and to reduce noise.

It should be noted that the charged particle track detector 10 is incorporated into, for example, a beam line of an accelerator, such that the charged particle track detector 10 can function as a charged particle track detector and can also be used as a trigger counter.

In addition, the charged particle track detector 10 can constitute a tomographic imaging device that performs imaging using charged particles in cosmic rays by combining a plurality of (for example, two) charged particle track detectors 10. Specifically, a pair of charged particle track detectors 10 are combined so that an object having an unknown structure (an unknown object) is interposed therebetween. In this case, the pair of charged particle track detectors 10 are disposed so that the unknown object is interposed between the back surface 12b of the radiator 12 in one of the charged particle track detectors 10 and the front surface 12a of the radiator 12 in the other charged particle track detector 10.

Here, when the charged particles pass through a certain substance, an angle (a scattering angle) formed by a track of the charged particles before passing through and a track of the charged particles after passing through depends on a composition of the substance before and after passing through. Therefore, with respect to charged particles incident on an unknown object from all angles and passing through the unknown object, a distribution of scattering angles before and after passing through is observed and information on the distribution of the scattering angles obtained by the observation is reconstructed, such that a composition of substance constituting the unknown object can be estimated.

Second Embodiment

A charged particle track detector 10A of the second embodiment differs from the charged particle track detector 10 of the first embodiment in that the light detection unit 13 includes a second photodetector 19, in addition to the first photodetector 14. Hereinafter, differences between the second embodiment and the first embodiment will be mainly described, and the same elements or members are denoted by the same reference numerals, and detailed description thereof will be omitted.

As illustrated in FIG. 7, the second photodetector 19 is provided on a surface (a predetermined surface) 12a of the radiator 12. That is, in the second embodiment, the back surface 12b of the radiator 12 corresponds to a first surface as a predetermined surface, and the front surface 12a of the radiator 12 corresponds to a second surface as a predetermined surface.

The second photodetector 19 detects the Cherenkov light C generated inside the radiator 12. In particular, the second photodetector 19 detects the Cherenkov light C generated inside the radiator 12 due to the charged particles P incident on the radiator 12 from the back surface 12b side. The second photodetector 19 includes a detection surface 19a in which a plurality of pixels 19b that perform photoelectric conversion are arranged two-dimensionally. The plurality of pixels 19b are disposed to correspond to the front surface 12a of the radiator 12. More specifically, the second photodetector 19 is coupled to the radiator 12 such that the front surface 12a and the detection surface 19a face each other. Each of these pixels 19b can hold a segment address that is a part of position information of the pixel 19b on the detection surface 19a and a detection time when Cherenkov light C has been detected at the segment address. The detection time is time information that is acquired based on the signal output from the second photodetector 19. The second photodetector 19 outputs the segment address and time information indicating the detection time to the control unit 15 as list data. Each pixel 19b may be constituted by, for example, a single photon avalanche diode (SPAD).

A light absorption layer 12d that absorbs the Cherenkov light C generated inside the radiator 12 is provided on the side surface 12c that is the outer surface other than the front surface 12a and the back surface 12b of the radiator 12. The same light absorption layer 12d as that in the first embodiment can be used as the light absorption layer 12d.

In the charged particle track detector 10A, when the charged particles P are incident on the radiator 12 from the back surface 12b side, the charged particles P interact with the medium and the Cherenkov light C is emitted. The Cherenkov light C propagates in one direction inside the radiator 12 because of its high directivity. The Cherenkov light C is detected by the plurality of pixels 19b constituting the second photodetector 19. Therefore, it is possible to geometrically obtain the track PT of the charged particles P from the position information and the time information of the plurality of pixels 19b that have detected the Cherenkov light C, and the propagation locus CT of the Cherenkov light C. A principle of specifying the track PT and the velocity β and the process of the control unit 15 are the same as in the first embodiment.

In the charged particle track detector 10A described above, the radiator 12 includes the front surface (the second surface) 12a and the back surface (the first surface) 12b that face each other as predetermined surfaces. The light detection unit 13 includes the first photodetector 14 in which the plurality of two-dimensionally arranged pixels 14b are disposed to correspond to the back surface 12b, and the second photodetector 19 in which the plurality of two-dimensionally arranged pixels 19b are disposed to correspond to the front surface 12a. Accordingly, it is possible to accurately specify the track of the charged particles with high temporal resolution for both of the charged particles incident on the radiator from the first surface side and the charged particles incident on the radiator from the second surface side.

The charged particle track detector 10A further includes the light absorption layer 12d that is provided on the side surface 12c that is an outer surface of the radiator 12 other than predetermined surfaces (the front surface 12a and the back surface 12b) and absorbs the Cherenkov light C. Accordingly, it is possible to suppress reflection of Cherenkov light C on a medium surface and to reduce noise.

The present invention is not limited to the above embodiment. For example, although the example in which the track PT in an area in which a photon density in the ellipse N is higher between the two candidates is specified as the actual track PT has been shown as a scheme for specifying which of the two candidates for the track PT is the actual track PT, other schemes may be used. For example, the track PT in an area in which the number of photons on the circumference of the ellipse N is larger may be specified as the actual track PT.

The material constituting the radiator 12 includes a medium such as silica airgel ($SiO_2$) or acrylic that has a low density and with which it is difficult to generate scintillation light, but the medium is not limited thereto. Materials other than the above materials may be used for the radiator 12 in consideration of a refractive index, a density, or the like according to the energy of the charged particles that are detection targets.

For the light absorption layer 12d, for example, when the radiator 12 is sufficiently wider in a flat shape than a spread of the emitted Cherenkov light C, the light absorption layer 12d on the side surface 12c can be omitted without consideration of reflection of light by the side surface 12c.

REFERENCE SIGNS LIST

10 Charged particle track detector
12 Radiator (medium)
12a Front surface (predetermined surface, second surface, outer surface)
12b Back surface (predetermined surface, first surface)
12c Side surface (outer surface)
12d Light absorption layer
13 Light detection unit
14 First photodetector
14b Pixel
15 Control unit
19 Second photodetector
19b Pixel
C Cherenkov light
CT Propagation locus
n Refractive index
P Charged particles
PT Track
β Velocity

The invention claimed is:

1. A charged particle track detector comprising:
a radiator including a medium that generates Cherenkov light by interacting with incident charged particles;
a light detection unit in which a plurality of two-dimensionally arrayed pixels are disposed to correspond to a predetermined surface of the radiator; and
a control unit configured to acquire position information and time information of the plurality of pixels that have detected the Cherenkov light based on a signal output from the light detection unit, and configured to obtain a track of the charged particles based on the acquired position information, the acquired time information, and a propagation locus of the Cherenkov light in the radiator.

2. The charged particle track detector according to claim 1, wherein the control unit further obtains a velocity of the charged particles.

3. The charged particle track detector according to claim 2, further comprising a light absorption layer that is provided on an outer surface of the radiator other than the predetermined surface and absorbs the Cherenkov light.

4. The charged particle track detector according to claim 2,
wherein the radiator includes a first surface and a second surface that face each other as the predetermined surfaces, and
the light detection unit includes a first photodetector in which the plurality of two-dimensionally arrayed pixels are disposed to correspond to the first surface, and a second photodetector in which the plurality of two-dimensionally arrayed pixels are disposed to correspond to the second surface.

5. The charged particle track detector according to claim 1, further comprising a light absorption layer that is provided on an outer surface of the radiator other than the predetermined surface and absorbs the Cherenkov light.

6. The charged particle track detector according to claim 5,
wherein the radiator includes a first surface and a second surface that face each other as the predetermined surfaces, and
the light detection unit includes a first photodetector in which the plurality of two-dimensionally arrayed pixels are disposed to correspond to the first surface, and a second photodetector in which the plurality of two-dimensionally arrayed pixels are disposed to correspond to the second surface.

7. The charged particle track detector according to claim 1,
wherein the radiator includes a first surface and a second surface that face each other as the predetermined surfaces, and
the light detection unit includes a first photodetector in which the plurality of two-dimensionally arrayed pixels are disposed to correspond to the first surface, and a second photodetector in which the plurality of two-dimensionally arrayed pixels are disposed to correspond to the second surface.

* * * * *